United States Patent
Maurer (10) Patent No.: US 9,781,905 B2
(45) Date of Patent: Oct. 10, 2017

(54) POSITIVE POSITION TRAINING LEASHES AND METHODS OF USING THE LEASHES FOR TRAINING A DOG

(71) Applicant: Celeste M. Maurer, Bedford, NH (US)

(72) Inventor: Celeste M. Maurer, Bedford, NH (US)

( * ) Notice: Subject to any disclaimer, the term of this patent is extended or adjusted under 35 U.S.C. 154(b) by 26 days.

(21) Appl. No.: 14/509,678

(22) Filed: Oct. 8, 2014

(65) Prior Publication Data

US 2016/0100554 A1    Apr. 14, 2016

(51) Int. Cl.
*A01K 15/00* (2006.01)
*A01K 27/00* (2006.01)
*A01K 15/04* (2006.01)

(52) U.S. Cl.
CPC ............ *A01K 15/04* (2013.01); *A01K 27/001* (2013.01); *A01K 27/003* (2013.01)

(58) Field of Classification Search
CPC ........ A01K 1/04; A01K 1/062; A01K 15/006; A01K 15/04; A01K 27/00; A01K 27/001; A01K 27/002; A01K 27/003
USPC .... 119/795, 797, 799, 814, 815, 837; 54/24; D30/152
See application file for complete search history.

(56) References Cited

U.S. PATENT DOCUMENTS

| | | | | |
|---|---|---|---|---|
| 2,421,173 A | * | 5/1947 | Ulrich | B68B 1/04 54/6.1 |
| 4,459,795 A | * | 7/1984 | Le Tixerant | B68B 1/04 54/24 |
| 4,774,801 A | * | 10/1988 | Johansen | B68B 1/02 119/792 |
| 4,838,206 A | * | 6/1989 | Anderson | A01K 25/00 119/831 |
| 4,852,336 A | * | 8/1989 | Gammill | B68B 1/02 54/24 |
| 4,964,369 A | * | 10/1990 | Sporn | A01K 27/002 119/818 |
| 5,038,717 A | * | 8/1991 | Bent | A01K 15/02 119/815 |
| D378,150 S | * | 2/1997 | DuBarry | D30/152 |
| 5,732,660 A | * | 3/1998 | David | A01K 25/00 119/792 |
| 5,992,352 A | * | 11/1999 | Borchelt | A01K 25/00 119/831 |
| 6,085,694 A | * | 7/2000 | Simon | A01K 27/002 119/792 |
| 6,295,795 B1 | * | 10/2001 | Ehrmann | B68B 1/02 54/24 |
| D458,717 S | * | 6/2002 | Mugford | A01K 27/002 D30/152 |

(Continued)

OTHER PUBLICATIONS www.humanesociety.org/animals/dogs/tips; "How to Use Head Halter on Your Dog"; Sep. 13, 2013.

*Primary Examiner* — Joshua Rodden
(74) *Attorney, Agent, or Firm* — Gary D. Mangels (57) ABSTRACT

A dog leash is adapted to assist a person in teaching, reinforcing and testing a learned behavior to a dog. The aid is especially effective in teaching a dog to watching and focusing on the head and/or upper body of a handler of the dog. The leash includes a chin controlling member that is placed under the chin of the dog and a guide connected to the controlling member. The handler and the dog can control contact between the dog and the chin controlling member. Methods of using the leash to allow the dog to focus on the handler are also described.

16 Claims, 5 Drawing Sheets

(56) References Cited

U.S. PATENT DOCUMENTS

| | | | |
|---|---|---|---|
| 6,595,156 B1 * | 7/2003 | Curran | A01K 25/00 119/792 |
| 6,796,274 B1 * | 9/2004 | Moynihan, III | A01K 25/00 119/831 |
| D524,997 S * | 7/2006 | Franco | A01K 27/002 D30/152 |
| D664,309 S * | 7/2012 | Mugford | D30/152 |
| 2002/0073936 A1 * | 6/2002 | Fields-Babineau | A01K 25/00 119/863 |
| 2009/0000570 A1 * | 1/2009 | Ashby | A01K 27/002 119/858 |
| 2015/0237831 A1 * | 8/2015 | Beck | A01K 27/003 119/795 |

* cited by examiner

Prong collar

Martingale collar

Pinch/choke collar

Fig. 9

POSITIVE POSITION TRAINING LEASHES AND METHODS OF USING THE LEASHES FOR TRAINING A DOG

FIELD OF THE INVENTION

The present invention relates to leashes and methods of using the leashes in teaching a dog, especially a competition obedience dog, to look in a direction desired by the handler, especially in the same direction as the dog handler's upper body, while keeping attention to the handler for cues. The leashes and methods of using the leashes are especially useful in the training of dogs used in obedience competition.

BACKGROUND OF THE INVENTION

There is a need for a leash that can be used in teaching an obedience competition dog to look in a direction desired by the handler, especially in the same direction as the dog handler's upper body, while keeping attention to the handler for cues. Teaching a dog to focus its attention on the handler is an important part of dog training, especially in competition obedience dog training. The ability of a dog to focus on the handler can also be important for the safety of the dog as well as people and other animals near the dog and its handler as it competes.

Various training aids and methods have been used since the domestication of dogs to assist in correcting, refining and altering the behavior of dogs. Leashes of various types have been used for many years in walking and training dogs. Early leashes consisted of rope, or a rope-like material, having a loop which was placed around the dog's neck. Leashes developed over time and today generally consist of an elongated leather, fiber or cloth web or metal chain member having a loop handle at one end and a fastening clip at the opposite end. The leashes are connected to a collar or a harness by connecting the fastening clip to the collar or harness. In recent years the focus on training equipment has generally shifted from leashes to collars, where the leash is often used as an extension of a handlers arm.

Numerous types of collars have been sold as for use in training dogs. Many of the collars are used to provide negative feedback to the dog when a certain behavior, such as pulling when trying to walk ahead of the handler where the dog takes the handler for a walk, occurs. These types of collars do not provide a way to use the leash that provides positive feedback.

Figure 8:
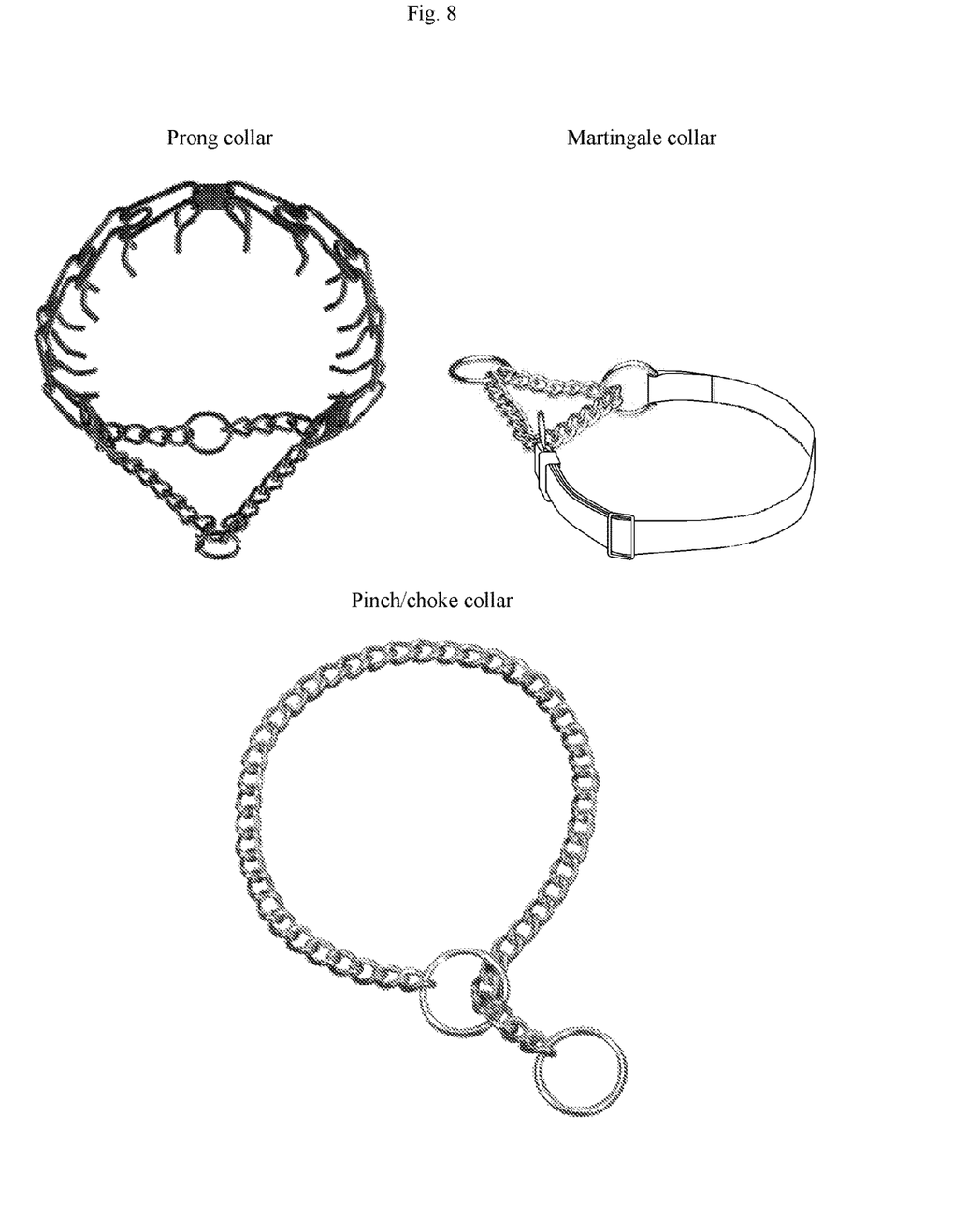
FIG. 8 shows examples of a "prong collar", a "martingale collar" and a "pinch/choke collar".

Two types of collars that have traditionally been used in training a dog are known as (1) a choke collar or choke chain and (2) a pinch or prong collar (FIG. 8). These collars work by primarily by negative reinforcement. When an undesired behavior occurs, such as trying to pull towards strangers or other dogs, the collar on the dog neck tightens as the leash attached to the collar is pulled on, from pulling by the dog and the handler as she/he attempts to control the dog, or both. The tightening of the collar causes the choke collar or the pinching elements of a prong collar against the neck of the dog. This causes some level of discomfort and often some level of pain to the dog. Use of a choke chain or prong collar often requires severe tightening of the collar on the dog's neck before a desired behavior correction is achieved. While this type of collar may be useful in correcting many undesired behaviors, one of the limitations of its use is that it does not direct a dog's attention to what is desired, but rather away from what is not desired.

There are also many types of electronic training collars used that control the behavior of a dog through the use of electrical stimulation delivered to the dog's neck by prong shaped electrodes are known in the art. Like choke chains and prong collars, electronic collars generally work by negative reinforcement and do not provide easy way to teach and reinforce a behavior, or a change in behavior, through positive means.

Training halters are another type of collar that has been used to change and control the behavior of a dog. The idea behind the use of the halter is to cause the dog to voluntarily comply with a handler's desires when the dog wants to go in a different direction than its handler or wants to move faster or slower than the handler. In using a halter, a leash snaps onto the collar of the halter under the chin of the dog. When the handler pulls on the leash, the dog's head will be pulled down and/or to the side, making it very difficult, and virtually impossible, for the dog to move ahead or pull the handler forward. Another objective of the use of some types of halters is to distribute the force generated from the handler pulling on the leash over a different and larger area of the dog than occurs using choke or prong collars. This reduces the discomfort or pain caused by using a halter compared to a choke or prong collar, where the choke collar or prongs/spikes of pinch or prong collar are forced into the neck of the dog. The Humane Society of the United States has indicated in its article of Sep. 13, 2013 entitled "How to Use a Head Halter on Your Dog" (www.humanesociety.org/animals/dogs/tips/how_to_use_head_halter.html) that a halter is "A very humane, effective way to restrain your dog." The article also teaches:

What's a halter?

A head halter is a special kind of collar designed for dogs who like to pull their people when they walk. It consists of a strap that goes around your dog's nose and another strap that goes around his neck, just behind his ears. The leash fastens to the halter under the dog's chin to a ring that's also attached to the nose strap.

When your dog begins to pull, the design of the head halter causes the dog's nose to be turned down and back toward you, which makes it physically difficult for him to continue pulling.

The head halter is a very humane method of restraint because it doesn't cause any pain. It works much better to stop a dog from pulling than a choke chain or prong collar. Some brand names of head halters include "Gentle Leader," "Promise Collar," and "Halti."

Other types of commercially halters that have been commercially available include the K9 Kumalon®, BeHave® and Snoot Loop®.

Figure 1:
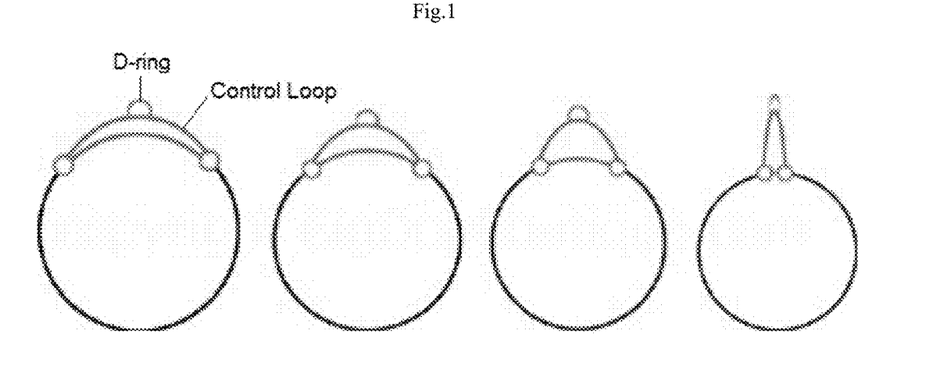
FIG. 1 illustrates a limited slip collar and its parts and also illustrates how the limited slip collar works.

A relatively new type of collar, a limited slip collar (also known as a Martingale collar), has been available for use on dogs. The limited slip collar was adapted for use on dogs from martingale tacks that were used on horses to control the height of the horses head and prevent the horse's head from raising above a certain level. The limited slip collar used on dogs does not provide control of the dog raising its head. Martingale collar consists of two connected loops, as shown in FIG. 1. The larger loop is placed around the dog's neck. The smaller loop, known as the control loop, passes through the two rings on each end of the larger loop. A leash can be connected to the active D ring on the control loop. (See FIG. 1) The dog can be controlled by pulling on the leash, which pulls on the control loop, causing the larger loop on the limited slip collar to contract around the neck of the dog. Originally the larger loop was made of leather or a web-type fabric. More recently, the limited slip collar has also become available with the larger collar being a choke or pinch collar.

While all types of collars are useful control aids and attire for dogs, the leash is an important device used in training dogs, especially competition obedience dogs.

There is a need for a leash that can be used in a positive motivation system that will assist in handling, controlling, and training dogs, especially where it is desirable to have the dog focus on the handler as in competition obedience venues.

The leashes and methods of using the leashes described herein are particularly useful for teaching a dog to look in a direction desired by the handler, especially in the direction of the dog handler's upper body to accomplish competition heelwork cues. The leashes and methods of using the leashes are particularly useful for dogs and handlers that participate in obedience competitions, but can also be used in a variety of other types of dog training activities.

More particularly, the invention relates to a leash adapted to be attached to a collar on a dog where a chin cradle on the leash is placed under the dog's chin to elicit a desired behavior while training the dog. In some embodiments, the leash is permanently connected to the collar. The leash described herein is an aid like an extra hand under the dogs chin.

BRIEF DESCRIPTION OF THE DRAWINGS

FIGS. 2a and 2b illustrate embodiments of a leash in which the comfort chin sling is movably connected to the leash by a loop formed from one or more of the components of the comfort chin sling.

SUMMARY OF THE INVENTION

Figure 9:
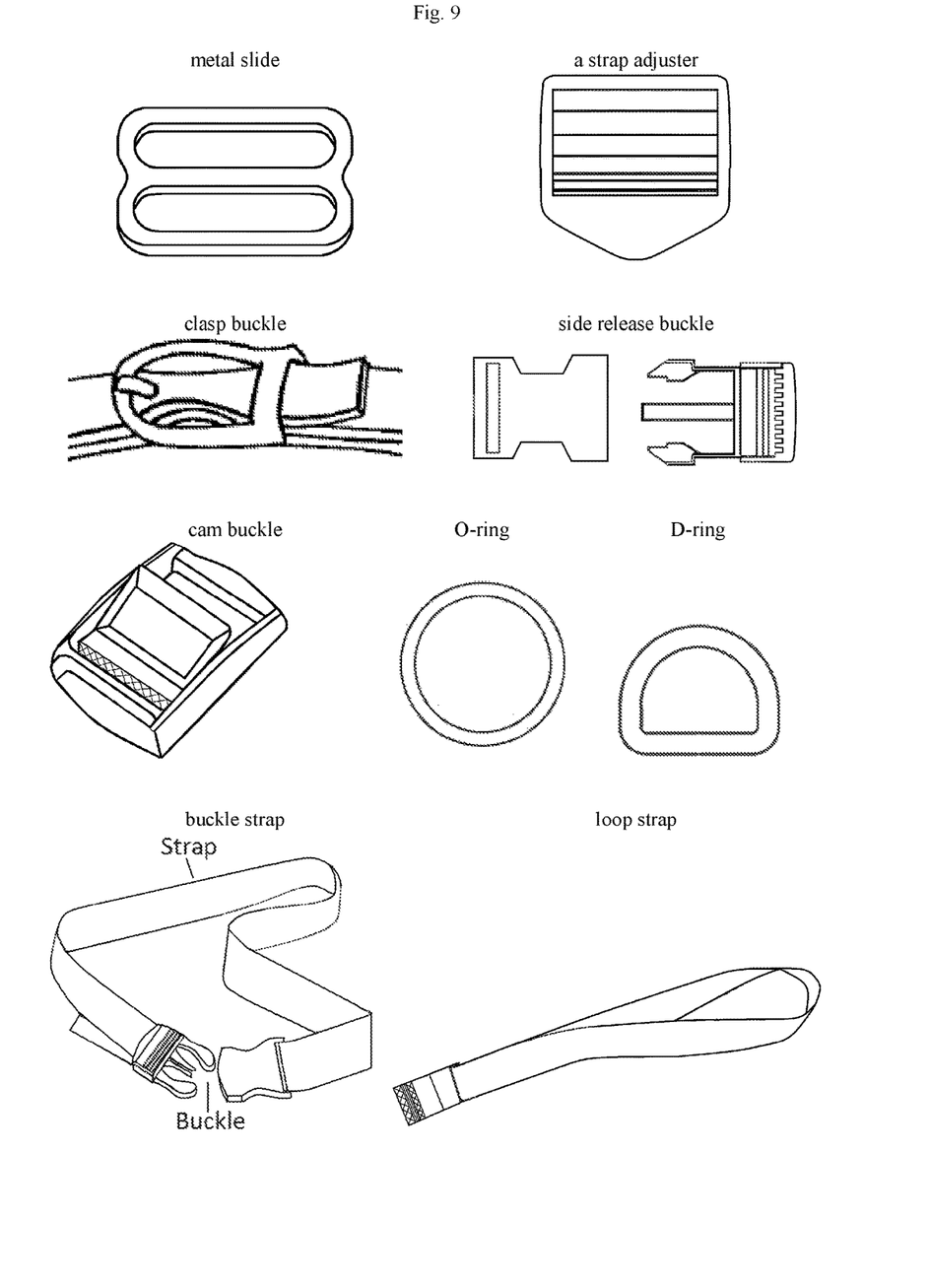
FIG. 9 shows examples of a means for adjusting the length of the guide.

The leash comprises a chin cradle and a guide, where the chin cradle comprises at least two means, preferably two or four means, for connecting the chin cradle to the guide and the guide comprises at least two means for connecting the guide to a collar. Preferably, the guide comprises two means for releasably connecting the guide to a collar, where each of the means comprise a snap hook. The chin cradle is preferably removably connected to the guide. The guide is made of at least one flexible material and can optionally comprise a means for adjusting the length of the guide. The means for adjusting the length of the guide can comprise a buckle strap, a loop strap, an O-ring, a D-ring, a metal slide, a strap adjuster, a clasp buckle, a side release buckle, or a cam lock buckle. (FIG. 9) The guide optionally and preferably contains a cover that covers at least a portion of the guide. The chin cradle is preferably made of a stiff material and is preferably covered with a soft, comfortable material such a fleece or a fleece-like material. The leash is configured so that the leash, when placed on a dog, preferably positions the chin cradle under the jaw of the dog, preferably near the chin. The location of the chin cradle under the jaw of the dog can vary depending upon the dog. In some embodiments, the leash also comprises a collar. Methods of using the leash comprise attaching the leash to a dog using a collar, or when the leash comprises a collar, attaching the collar on the leash to the dog. When the leash is attached to the dog, the chin cradle is positioned under the jaw of the dog, preferably in an area near the chin of the dog. The method of using the leash can further comprise the handler guiding the head of a dog to be oriented towards a desired location using the leash to guide the head of the dog to the desired direction. The method can further comprise transmitting instructions or feedback to the dog using a verbal command. The method can further comprise providing positive reinforcement by the handler, such as through the use of food, or another means, while the dog is looking in the direction desired by the handler. One preferred positive reinforcement method allows the dog and handler to use a portion of the leash containing the cover as a tugging device.

DETAILED DESCRIPTION OF THE INVENTION

Figure 2A:
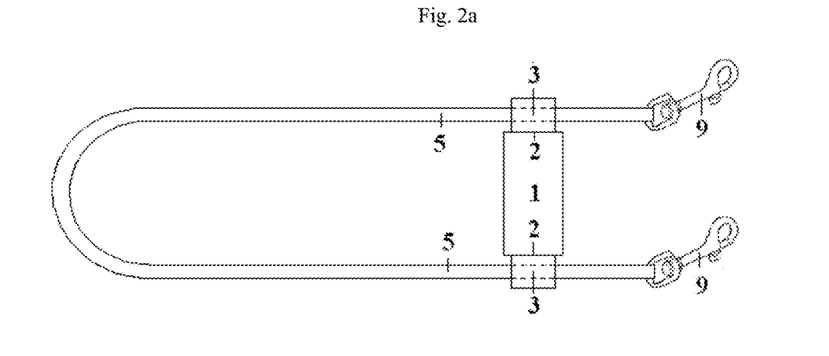
FIG. 2a shows the leash positioned flat, as on a table top.

FIG. 2a shows an embodiment of a leash comprising a chin cradle (1) having two ends (2) and a guide (5), where each end (2) of the chin cradle (1) is connected to the guide (5) by a guide connection means (3), and the guide comprises two means (9) for connecting the guide to a collar (10). The leash shown in FIG. 2a is positioned flat, as on a table top.

The chin cradle (1) can be made from a variety of materials, including, but not limited to, leather, cloth (such as fleece, flannel, denim or twill), webbing and strapping. In some embodiments, the comfort chin sling comprises a stiffening means. Preferably the stiffening means comprises plastic, plastic mesh, metal, wire mesh, or reinforced fiberglass. The chin cradle (1) can further comprise one or more protrusions, such as bumps or ridges. The chin cradle (1) is preferably flexible. In some embodiments, the chin cradle (1) also has rigidity. The term rigidity, as used herein, means that the chin cradle remains in an approximately planar form when supported only at the two ends (2) of the chin cradle (1). The chin cradle (1) comprises at least one material that provides rigidity. Preferably, the chin cradle (1) when placed on the dog is deformable to cradle the dog's chin.

Figure 2B:
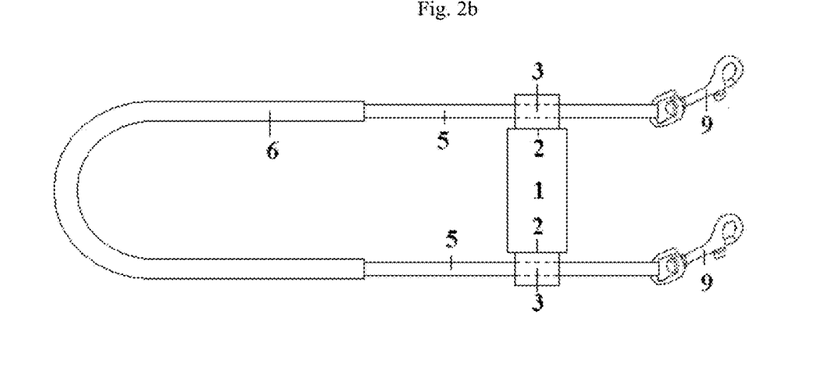
FIG. 2b shows the leash including a cover on a portion of the guide, where the leash is positioned flat, as on a table top.

The guide (5) can be made of one or more flexible, preferably non-elastic, materials, including, but not limited to, leather, cloth (such as fleece, flannel, denim or twill), webbing and strapping. In a preferred embodiment, a cover (6) is optionally located over at least a portion of the guide (5), as shown in FIG. 2b.

The means (3) for connecting the chin cradle (1) to the guide (5) can provide either a fixed or a removable connection between the chin cradle (1) and the guide (5). In preferred embodiments, the means (3) for connecting the chin cradle (1) to the guide (5) is a loop formed from one or more of the materials used to form chin cradle (1). In a preferred embodiment, the means (3) for connecting the chin cradle (1) to the guide (5) comprises belting from the chin cradle (1) which is looped around the guide (5) and connected to the chin cradle (1).

The guide (5) can optionally comprise a cover (6) that covers at least a portion of the guide (5), preferably between the two means (3) for connecting the chin cradle (1) to the guide (5). A cover, or a portion of a cover, can also be located between a means (3) for connecting the chin cradle (1) to the guide (5) and a means (9) for connecting the guide (5) to a collar (10). The cover (6) can be made of any type of flexible material. Preferable the flexible material is not abrasive.

Figure 7:
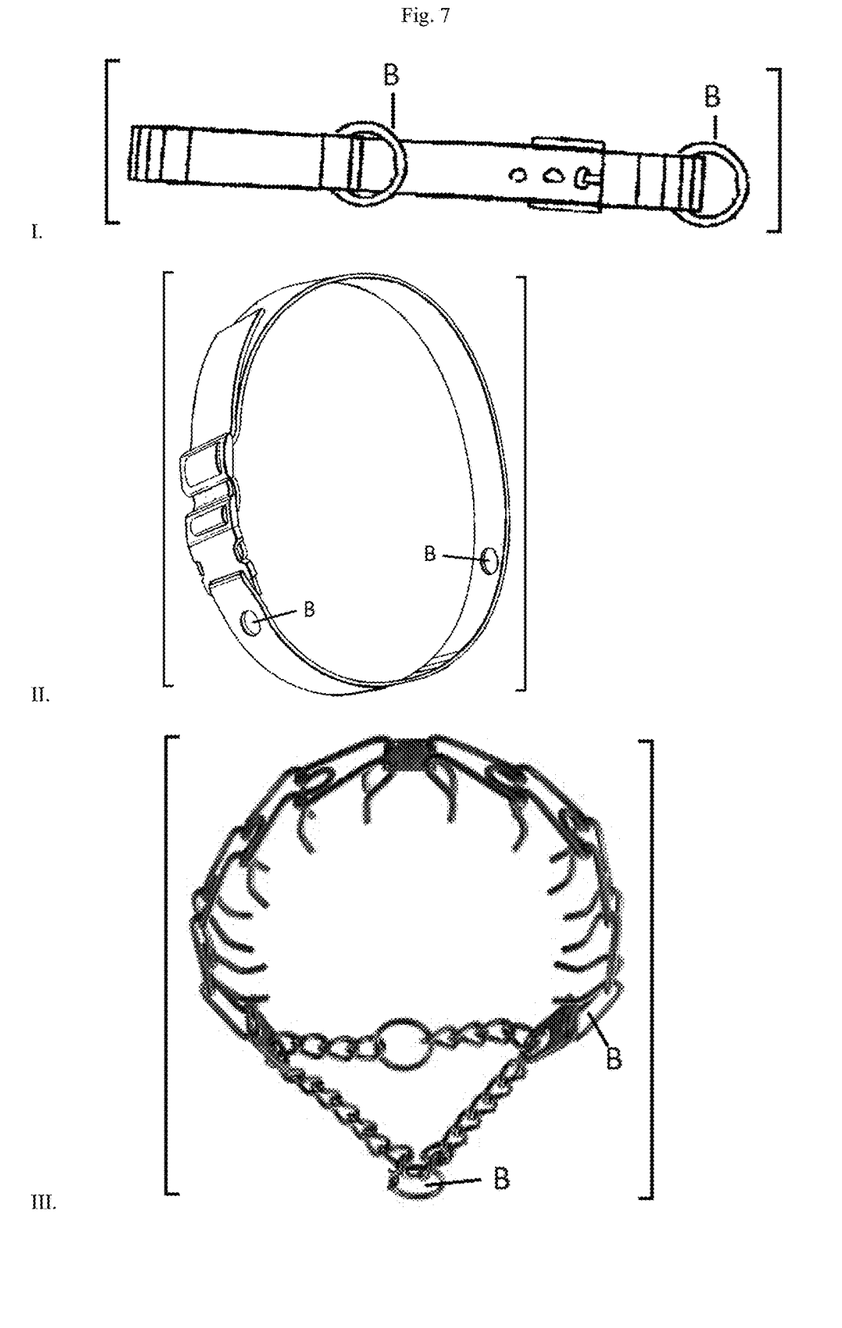
FIG. 7 show examples of collars each having two means (B) for connecting the collar to the guide.

The means (9) for connecting the guide (5) to a collar (10) can either a permanent connection or a releasable connection. The means (9) for forming a permanent connection can comprise any permanent connection means known to one in the art, including, but not limited to, a loop, an O-ring, a D-ring, a swivel, a shackle or a split ring. The means (9) for forming a releasable connection can comprise any releasable connection means known to one in the art, including, but not limited to, a snap hook or a quick link. (FIG. 2) Preferably the collar (10) comprises at least two means (B) for connecting the collar (10) to the guide (5). More preferably, the two means can be placed a distance from each other such that the distance between the means is at least approximately the length of the chin cradle (1). (See FIG. 7)

Figure 3:
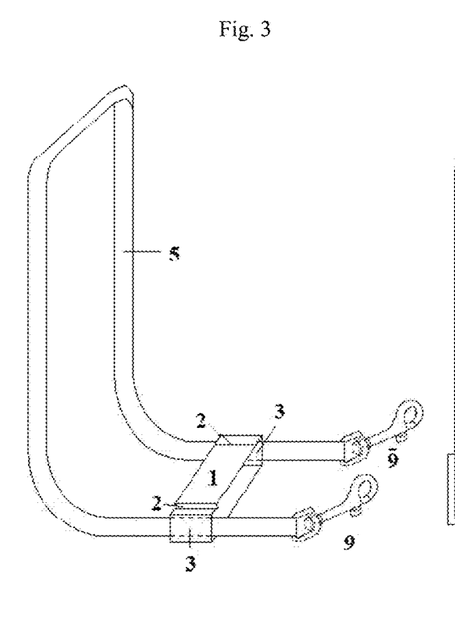
FIG. 3 illustrates an embodiment where the leash is shown in a three-dimensional drawing.

FIG. 3 is a 3-dimensional drawing showing a configuration in which the leash would be in when positioned on a dog. The leash comprises a chin cradle (1) having two ends (2) and a guide (5), where each end (2) of the chin cradle (1) is connected to the guide (5) by a guide connection means (3), and the guide comprises two means (9) for connecting the guide to a collar (10).

Figure 4:
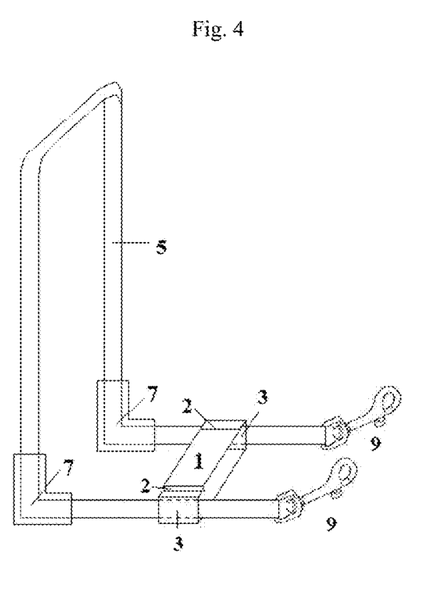
FIG. 4 illustrates another embodiment where the leash is shown in a three-dimensional drawing.

FIG. 4 is a 3-dimensional drawing showing a configuration in which the leash would be in when positioned on a dog. The leash in FIG. 4 comprises two right angle connectors that change the shape of the leash by providing a permanent change in the shape of the guide (5).

Method of Use

Figure 5:
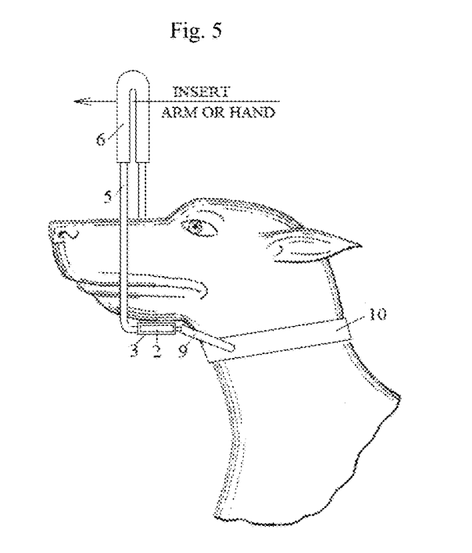
FIG. 5 shows a view from the side of the dog where the leash is positioned in a configuration that occurs when the leash is on a dog.
Figure 6:
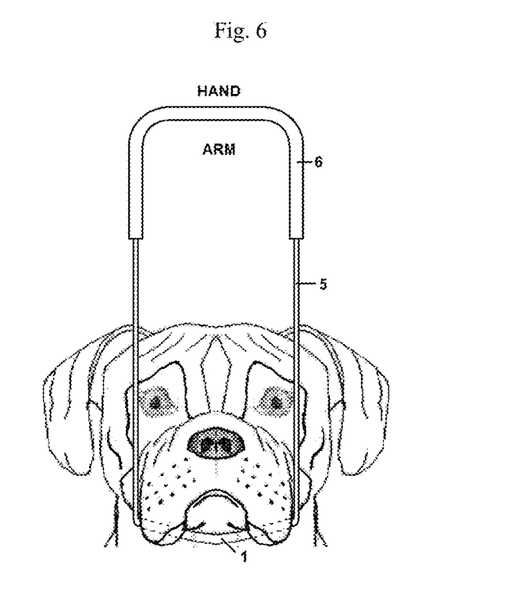
FIG. 6 shows a view from the front of the dog where the leash positioned in a configuration that occurs when the leash is on a dog.

FIGS. 5 and 6 show an embodiment in which a leash comprising a cover (6) is positioned on a medium or large size dog where the handler can place a forearm through a loop formed in a portion of the leash containing the cover (6). When the leash is placed on a small dog, or a medium or large size dog is learning how to be trained using the leash, a handler can hold a loop formed in a portion of the leash containing the cover (6) in their hand. When the leash does not comprise a cover (6) the leash can be positioned or held in the same area as when the leash comprises a cover (6).

The leash can be placed on the dog by: (a) attaching the means (9) for connecting the guide (5) to a collar (10) at one, preferably two, points on a collar (10) and then attaching the collar (10) onto the dog; (b) attaching the means (9) for connecting the guide (5) to a collar (10) at one, preferably two points on a collar (10), while the collar (10) is on the dog; or (c) attaching a leash that is non-releaseably connected to a collar (10) onto the dog. After the leash is connected to the collar (10) and the collar (10) is placed on the dog, the chin cradle (1) is placed under the jaw of the dog, preferably at or near the chin, with a portion of the guide (5) between the chin cradle (1) and the means (9) for connecting the guide (5) to a collar (10) located preferably near the part of the dog where the chin and neck of the dog intersect. After both of the means (9) for connecting the guide (5) to a collar (10) are connected to the collar (10), a loop is formed in the guide. The guide (5) is then held approximately vertically by holding the guide (5) with one or more hands or by placing an arm through the loop and positioning the guide on the forearm. The positioning of the head of the dog can be controlled in three dimensions by the direction of pressure exerted by the leash on the area where the guide (5) contacts the chin on the dog. The head of a dog can be adjusted in a vertical dimension (up and down) by applying upward pressure on the guide (5) using a hand holding the guide or the handlers arm that is looped through the guide. Preferably the amount of pressure that is placed on the chin of the dog is minimal, that is the lowest amount of pressure needed to obtain the desired response.

When the leash is first placed on the dog, most dogs will need to become conditioned to having the chin cradle (1) in contact with its chin and having a portion of the guide (5) on each side of its head between its eyes and ears. In the descriptions below, it is assumed that the dog is located on the left side of the handler. Similar procedures can be adapted to teaching a dog that is located on the right side of the handler. One method of conditioning the dog to the use of the training aid is for the handler to either hold the guide (5) in their hand closest to the dog or to place a loop formed by the guide (5) over the forearm closest to the dog. The handler can place food in their hand that is joined to their arm that is furthest from the dog and place their hand containing the food near and above the dog's mouth. The handler gives the food to the dog as soon as the dog exhibits the desired behavior, a change in the point of attention. Preferably this is performed in conjunction with either verbal reinforcement or reinforcement through the use of a clicker. One of ordinary skill in the art would understand what a clicker is and how to use a clicker in conjunction with the training collar. The leash can be used to provide additional positive reinforcement by using the portion of the leash containing a cover as a tugging device. This feature allows for more rapid reinforcement, since it is not necessary to use a separate tugging device. One skilled in the art of behavior modification, especially with dogs, would recognize that reinforcement works best the sooner it can be given after the desired behavior occurs. By having a tugging device as part of the leash, more rapid reinforcement can occur versus the use of a separate tugging device, which would need to be separately located and then introduced to the dog.

The term cues, as used herein, means one or more of the changes in the movement of the dog and handler. Cues include starting to move forward from a sit position, changing from a normal pace to a fast or slow pace, changing from a fast or slow pace to a normal pace, stopping forward movement (halting), changing the direction of movement by 180° (about turn) and by changing the direction of movement by 90° (left or right turns).

As the dog becomes used to the presence of the leash, the leash can then be used to modify the behavior of the dog to better perform the various cues. In the descriptions below, it is assumed that the dog is located on the left side of the handler. Similar procedures can be adapted to teaching a dog that is located on the right side of the handler. The dog can learn to look in a direction desired by the handler (also referred to as a point of attention), preferably at the upper portion of the handlers body, more preferably at their face, by placing their hand or arm in the guide, as described above, and then placing moving their hand or arm in a direction towards the point of attention. This movement of the hand or arm places tension on the collar on the dog through the guide (5). Preferably the amount of tension used is the least amount to achieve at least an incremental change in the direction that the dog is looking. The handler has control of the amount of tension applied to the dog. The handler has the ability to reduce or increase amount of tension depending on the response of the dog. With choker type collars, the more force the dog applies to the collar the more the collar restricts and the more pain the dog feels. The dog adjusts to the discomfort caused by the choker collar rather than the training efforts by the handler. The handler gives the food to the dog as soon as the dog exhibits the desired behavior, a change in the point of attention. Preferably this is performed in conjunction with either verbal reinforcement or reinforcement through the use of a clicker. The training guide is preferably used to adjust the dog's point of attention using several incremental changes in the point of focus. When the methods described above are used in conjunction with a verbal reinforcement or the use of a clicker, it can be easier for the dog to modify its point of attention. Changes in the behavior of the dog are accomplished by repeated modification to the point of attention over time, in conjunction with positive reinforcement through the use of food and verbal praise or clicker reinforcement, but not through the infliction of extreme discomfort or the infliction of pain.

From the following drawings and description of the preferred embodiment, it will be appreciated by those of skill in the art that the objects of the invention have been achieved. While the present invention will be described with the reference to specific embodiments, the following description is illustrative of the invention and is not to be construed as limiting the invention. Various modifications to the present invention can be made to the preferred embodiment by those skilled in the art without departing from the true spirit and scope of the invention. It will be noted here that for better understanding like components are designated by the reference numerals throughout the various figures of drawing which follow.

The invention claimed is:

1. A leash comprising a guide, a chin cradle having two ends and a collar, where the guide is a continuous piece of flexible material with no additional joining elements and the guide has two ends and each end of the guide comprises a means for connecting the guide to the collar, and each end of the chin cradle is connected to the guide by a guide connection means, wherein the guide connection means comprise a hollow form, wherein the hollow form is adapted to allow the guide to pass through the hollow form, wherein when the leash is in use on an animal, a portion of the guide forms a loop located above the head of the animal.

2. The leash of claim 1, wherein the means for connecting the guide to the collar releasably connects the guide to the collar.

3. The leash of claim 2, wherein the collar is a buckle collar, a prong collar, Martingale collar or a pinch/choke collar.

4. The leash of claim 1, wherein the hollow form is a permanent fixture, a loop on the chin guide, a snap hook or a quick link.

5. The leash of claim 1, wherein the chin cradle comprises a flexible material.

6. The leash of claim 1, wherein the chin cradle comprises webbing or a plastic.

7. The leash of claim 1, wherein the flexible material comprises a webbing, a woven fabric, leather, canvas or a synthetic fiber.

8. The leash of claim 1, wherein the guide comprises a means for adjusting a length of the guide.

9. The leash of claim 8, wherein the means for adjusting the length of the guide does not form a loose end.

10. The leash of claim 8, wherein the means for adjusting the length of the guide comprises a buckle strap, a loop strap, an O-ring, a D-ring, a metal slide, a strap adjuster, a clasp buckle, a side release buckle, or a cam lock buckle.

11. The leash of claim 1 further comprising a cover that covers a portion of the guide.

12. The leash of claim 1, wherein the leash comprises a fabric cover, the guide connection means is releasably connected to the collar, and the chin cradle comprises a stiffening means and one or more protrusions.

13. The leash of claim 1, wherein the guide comprises a fabric web, where each of the two means for connecting the guide to the collar comprise a clasp.

14. A method of training a dog, said method comprising attaching the leash of claim 1 to the dog, wherein the guide is connected to the collar on the dog by the means for connecting the guide to the collar, the chin cradle is positioned under the chin of the dog proximal to the neck of the dog, and a portion of the guide is located on each side of the dog's head proximal to the ears.

15. The leash of claim 1, wherein when the leash is in use on an animal, the leash is not in contact with the top portion of the animal between the nose and eyes of the animal.

16. A leash comprising a chin cradle having two ends, a collar and a guide comprising at least three segments, wherein a first segment and second segment of the at least three segments each comprise a means for connecting the guide to the collar and the first and second segments are connected by at least one additional segment of the at least three segments, where each end of the chin cradle is connected to the guide by a guide connection means, wherein the guide connection means comprise a hollow form, wherein the hollow form is adapted to allow the guide to pass through the hollow form, wherein when the leash is by use on an animal, the guide is a continuous portion with a loop formed in a portion of the leash located above the head of the animal, wherein a connection between each of the first and second segments to the at least one additional segment comprises a flexible connect that joins a respective one of the first and second segments and the at least one additional segment at an angle.

* * * * *